(12) United States Patent (10) Patent No.: US 7,732,938 B2
Totani et al. (45) Date of Patent: Jun. 8, 2010

(54) ADAPTER FOR USE WITH VEHICLE-MOUNTED ELECTRONICS

(75) Inventors: Tsutomu Totani, Nagoya (JP); Yasuo Serikawa, Nagoya (JP)

(73) Assignee: Beat-Sonic Co., Ltd., Aichi (JP)

( * ) Notice: Subject to any disclaimer, the term of this patent is extended or adjusted under 35 U.S.C. 154(b) by 797 days.

(21) Appl. No.: 11/580,423

(22) Filed: Oct. 12, 2006

(65) Prior Publication Data

US 2008/0089015 A1 Apr. 17, 2008

(51) Int. Cl.
*H02G 3/00* (2006.01)
(52) U.S. Cl. .......................................... 307/9.1; 700/36
(58) Field of Classification Search .................. 307/9, 307/10, 116, 125, 130; 701/36
See application file for complete search history.

(56) References Cited

U.S. PATENT DOCUMENTS

| | | | | |
|---|---|---|---|---|
| 4,937,672 A | * | 6/1990 | Anderson | 348/554 |
| 5,091,856 A | * | 2/1992 | Hasegawa et al. | 701/36 |
| 5,452,474 A | * | 9/1995 | Kagawa | 455/569.1 |
| 5,467,277 A | * | 11/1995 | Fujisawa et al. | 701/51 |
| 5,916,288 A | * | 6/1999 | Hartman | 701/36 |
| 6,119,060 A | * | 9/2000 | Takayama et al. | 701/36 |

FOREIGN PATENT DOCUMENTS

| | | |
|---|---|---|
| JP | H6-262985 | 9/1994 |
| JP | H8-70234 | 3/1996 |
| JP | 2003-224631 | 8/2003 |
| JP | 2005-212690 | 8/2005 |

* cited by examiner

*Primary Examiner*—Albert W Paladini
(74) *Attorney, Agent, or Firm*—William L. Androlia; H. Henry Koda

(57) ABSTRACT

An adapter for use with vehicle-mounted electronics includes an adapter body further including an input section having at least one main input terminal to which a video signal or audio signal is supplied and at least one secondary input terminal to which a video signal or audio signal is supplied, an output section having an output terminal from which a video signal or audio signal is delivered, a switching element switching an output signal from the input section between the main input terminal side and the secondary input terminal side, and a control section controlling the switching element. The control section includes a detector detecting a signal supplied to the secondary input terminal side. The control section controls the switching element based on signal detection by the detector so that the output signal from the input section is switched from the main input terminal side to the secondary input terminal side.

4 Claims, 3 Drawing Sheets

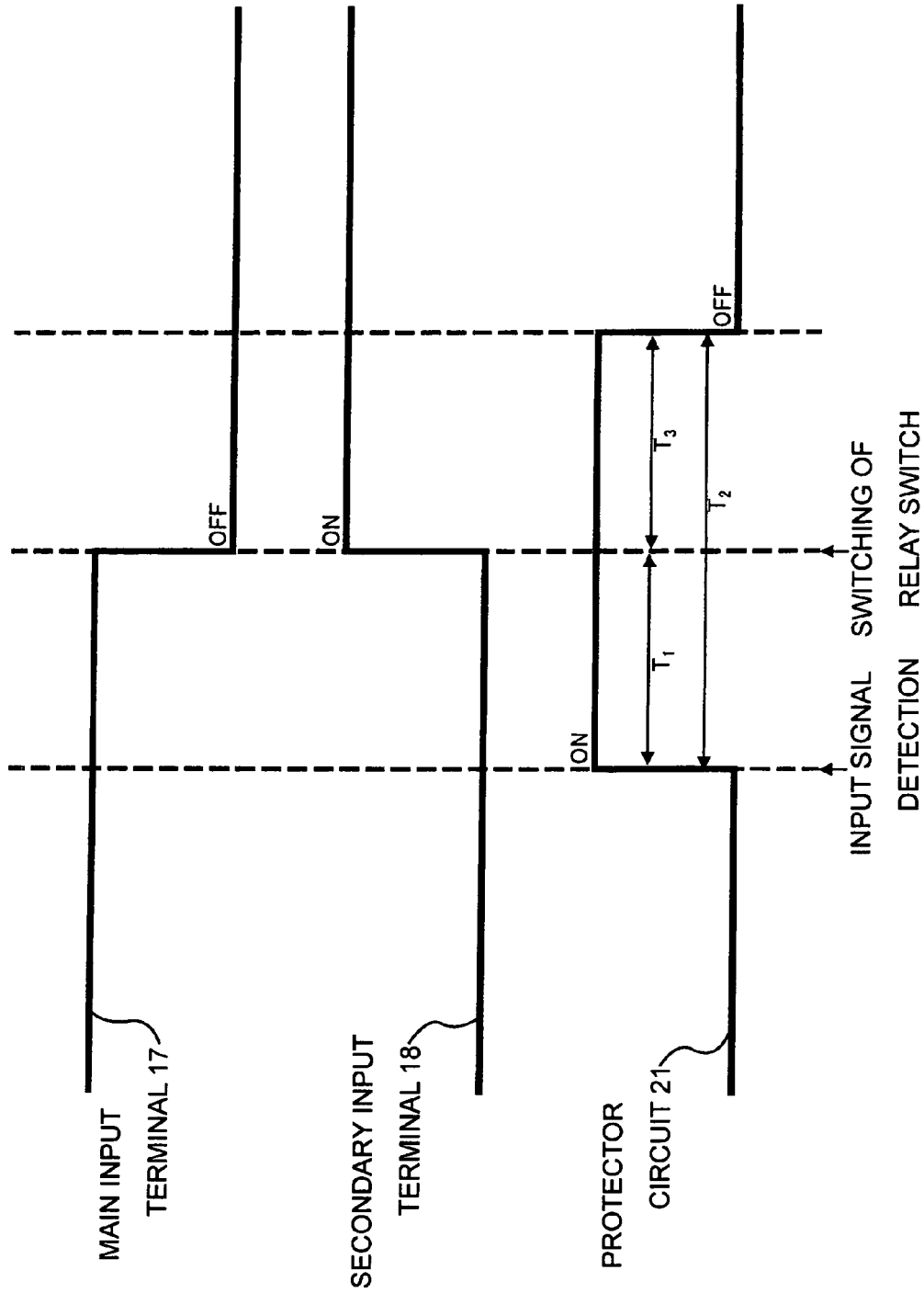

ADAPTER FOR USE WITH VEHICLE-MOUNTED ELECTRONICS

CROSS-REFERENCE TO RELATED APPLICATIONS

This application is based upon and claims the benefit of priority from the prior Japanese Patent Application No. 2005-247326, filed on Aug. 29, 2005, the entire contents of which are incorporated herein by reference.

BACKGROUND OF THE INVENTION

1. Field of the Invention

The present invention relates to an adapter suitable for use with vehicle-mounted electronics.

2. Description of the Related Art

Vehicles such as automobiles have conventionally been installed with genuine systems designed in compliance with vehicle specifications, such as genuine car audio systems or car navigation systems. On the other hand, portable audio/video devices are commercially available and comprise a recording medium such as a small-sized hard disc or flash memory with large capacity which is capable of storing a large amount of audio or video data. A frequency modulation (FM) transmitter is used in order that a portable audio/video device may be used via the aforesaid genuine system in a vehicle. In this case, for example, audio data is delivered from a car radio.

However, audio/video signals are delivered through a wireless circuit when the FM transmitter is used in the manner as described above. Accordingly, audio/video signals are susceptible to degradation or noise influences. Furthermore, since both portable audio/video device and car radio need to be powered up and then operated individually, the operation is troublesome. Still furthermore, digital versatile disks (DVDs) used with the aforesaid portable audio/video devices or car navigation systems have not unified to one standard including recording and reproducing systems and the like. However, users of the portable audio/video devices have strong demand for use of the portable audio/video devices or car navigation systems through the intermediary of the aforesaid genuine systems. However, since the genuine systems are designed in compliance with vehicle specifications, it is troublesome and expensive to install, into the genuine vehicle systems, vehicle-mounted electronics having different specifications of recording/reproducing system etc. from the genuine vehicle systems.

SUMMARY OF THE INVENTION

Therefore, an object of the present invention is to provide an adapter for use with vehicle-mounted electronics, which enables vehicle-mounted electronics to be easily added to car audio systems or the like.

The present invention provides an adapter for use with vehicle-mounted electronics, comprising an adapter body including an input section provided with at least one main input terminal to which a video signal or audio signal is supplied and at least one secondary input terminal to which a video signal or audio signal is supplied, an output section provided with an output terminal from which a video signal or audio signal is delivered, a switching element switching an output signal delivered from the input section between the main input terminal side and the secondary input terminal side, and a control section controlling the switching element, wherein the control section includes a detector which detects a signal supplied to the secondary input terminal side, and the control section controls the switching element based on signal detection by the detector so that the output signal delivered from the input section is switched from the main input terminal side to the secondary input terminal side.

The input section is provided with the main input terminal to which vehicle-mounted electronic composing a genuine car audio system, car navigation system, etc. is connected and the secondary input terminal to which a vehicle-mounted electronic such as a vehicle-mounted video/video or the like is connected. A detector detecting a signal supplied to the secondary input terminal side of the input section. Accordingly, the output signal from the input section is switched from the main input terminal side to the secondary input terminal side when a signal is detected at the secondary input terminal side of the input section in order that the newly added vehicle-mounted electronic may be used. Consequently, the arrangement of the adapter for the vehicle-mounted electronic can be simplified.

In one embodiment, the input section includes a balance input circuit. Since the balance input circuit is provided in the input section, a genuine system and an added vehicle-mounted electronic are isolated from a noise source of the vehicle. Consequently, noise peculiar to the vehicle can be prevented from superimposing the audio or video signal.

In another embodiment, the control section includes a protector interrupting a circuit between the switching element and the output section, for a predetermined time, based on the signal detection by the detector. The protector is provided in the control section for interrupting for the predetermined time the delivery passage the audio/video signal passing through the adapter body when the output signal from the input section is switched from the main input terminal side to the secondary input terminal side. This can prevent contact noise produced during the switching of the signal delivery passage or noise produced with start of the vehicle-mounted electronic.

BRIEF DESCRIPTION OF THE DRAWINGS

Other objects, features and advantages of the present invention will become clear upon reviewing the following description of the preferred embodiment with reference to the accompanying drawings, in which:

FIG. 3 is a time chart showing the state of a protector circuit provided in the adapter.

DETAILED DESCRIPTION OF THE INVENTION

Figure 1:
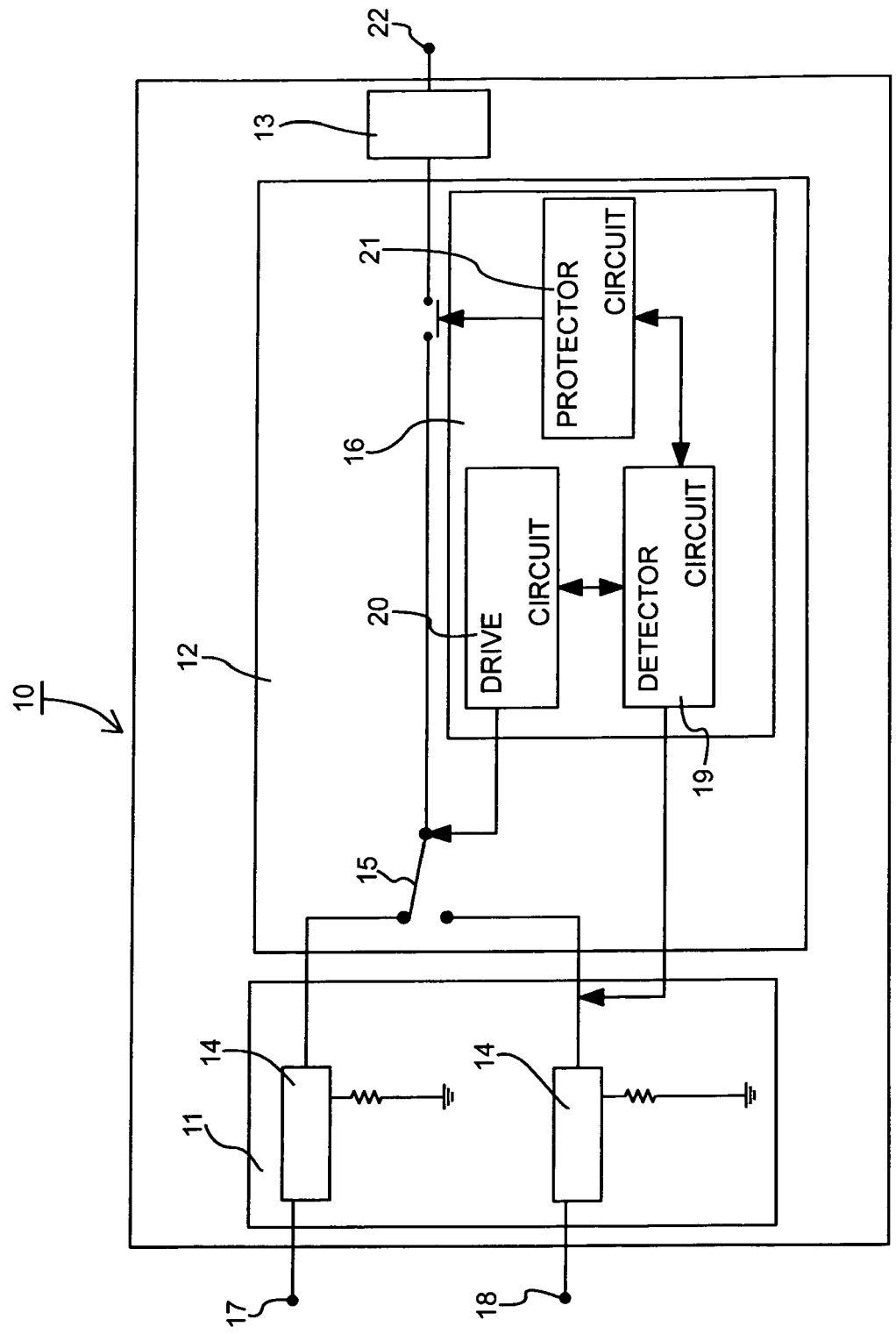
FIG. 1 is a circuit diagram showing an adapter for vehicle-mounted electronics in accordance with one embodiment of the present invention.

One embodiment of the invention will be described with reference to the accompanying drawings. Referring to FIG. 1, a vehicle-mounted electronic adapter 10 of the embodiment is shown. The adapter 10 comprises an input section 11, an adapter body 12, an output section 13 electrically connected to one another. The adapter body 12 includes a relay switch 15 and a control section 16.

Figure 2:
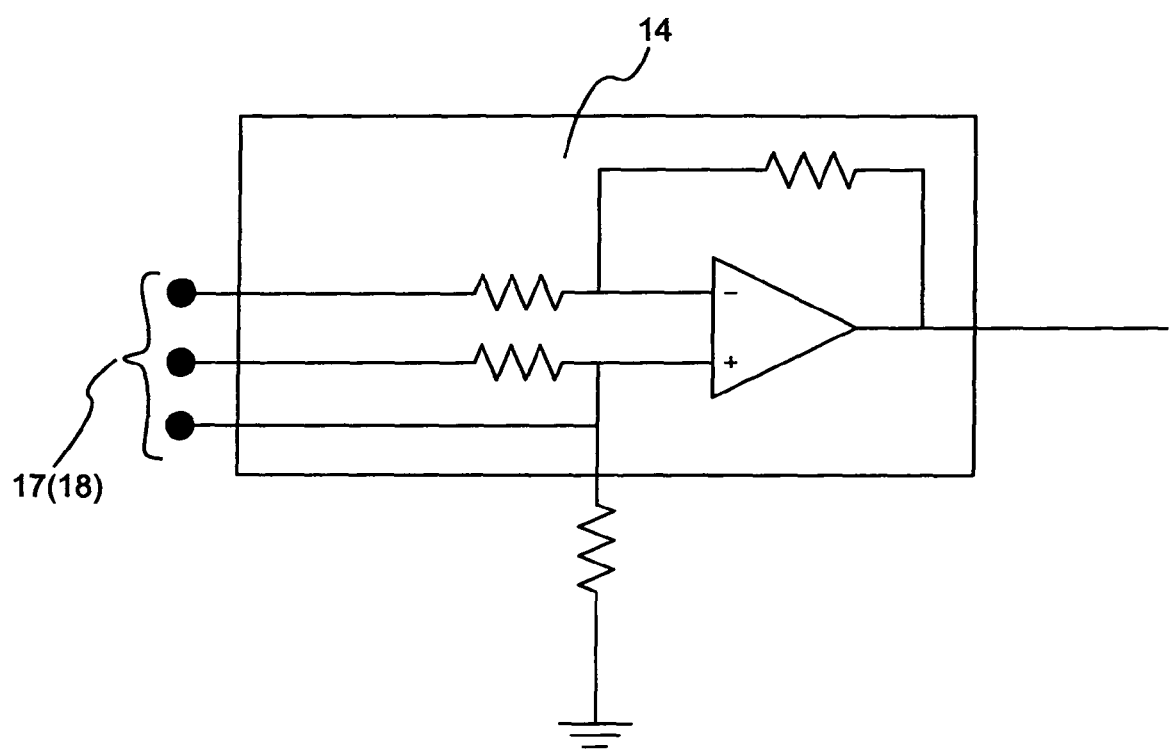
FIG. 2 shows a balance input circuit provided in the adapter.

The input section 11 includes a main input terminal 17 to which is supplied an audio/video signal from a vehicle-mounted electronic such as a genuine car audio system, car navigation system or the like. The input section 11 also includes a secondary input terminal 18 to which is supplied an audio/video signal from a vehicle-mounted electronic to be mounted in addition to the genuine car audio system, car navigation system or the like. Both input terminals 17 and 18 are connected via respective grounded balance input circuits 14 to the relay switch 15. Each balance input circuit 14 is composed of a differential amplifier circuit of an operational amplifier as shown in FIG. 2. Each balance input circuit 14 has an inverting input terminal (−), a non-inverting input terminal (+) and a ground terminal.

The control section 16 includes a detector circuit 19, a drive circuit 20 and a protector circuit 21. The detector circuit 19 detects a signal supplied to the secondary input terminal 18 side. The drive circuit 20 switches the relay switch 15 between the main input terminal 17 side and the secondary input terminal 18 side, based on the signal detected by the detector circuit 19 and an output signal from the input section 11. The protector circuit 21 interrupts a circuit between the relay switch 15 and the output terminal 22, based on the signal detected by the detector circuit 19.

Each balance input circuit 14 may be composed of a transformer instead of the operational amplifier in the embodiment. Furthermore, the balance input circuits comprising the respective operational amplifiers or transformers may be provided in the output section 13, instead of the input section 11.

A manner of using the aforesaid adapter 10 for the vehicle-mounted electronics will now be described. FIG. 3 is a time chart showing an on-off state of the protector circuit 21 with lapse of time. The axis of abscissas denotes time. A vehicle-mounted electronics is connected via wire harness to the main input circuit 17 side of the input section 17. The vehicle-mounted electronic constitutes a genuine car audio system, car navigation system or the like. Another vehicle-mounted electronics to be added is connected via wire harness, pin jack or the like to the secondary input terminal 18 side.

The protector circuit 21 is provided in the control section 16 of the adapter 10. The protector circuit 21 operates for time $T_2$ every time receiving a detection signal indicative as to whether or not signal detection by the detector circuit 19 has occurred. Upon lapse of time T1 from the signal detection by the detector circuit 19, the relay switch 15 is set so as to be switched by the drive circuit 20.

When the added vehicle-mounted electronics is powered up, the detector circuit 19 of the adapter 10 detects the input signal to the secondary input terminal 18, delivering the detection signal to both drive circuit 20 and protector circuit 21. Upon receipt of the detection signal, the protector circuit 21 first interrupts a circuit between the relay switch 15 and the output terminal 22. When time $T_1$ has elapsed, the drive circuit 20 drives the relay switch 15 so that an output signal of the input section 11 is switched from the main input terminal 17 side to the secondary input terminal 18 side. Upon lapse of time $T_3$, the added vehicle-mounted electronic connected to the secondary input terminal 18 side becomes available since the protector circuit 21 reconnects the interrupted circuit.

On the other hand, when the added vehicle-mounted electronics is powered down, the detector circuit 19 stops signal supply to the drive circuit 20 and protector circuit 21 since an input signal from the secondary input terminal 18 side is not detected. Accordingly, the control circuit 16 operates to switch the output signal of the input section 11 from the secondary input terminal 18 side to the main input terminal 17 side.

The output signal is not delivered to an output device connected to the output terminal 22 for a predetermined time since the protector circuit 21 interrupts the signal delivery passage between the relay switch 15 and the output section 13 for time $T_2$. As a result, no sound is produced by an audio output apparatus such as loud speakers. A video output apparatus such as video monitors displays a black no-signal state screen.

Furthermore, the detector circuit 19 is provided at the secondary input terminal 18 side. It is not until input of a signal to the secondary input terminal 18 side that the relay switch 15 is switched. Accordingly, the relay switch 15 is switched when the vehicle-mounted electronics connected to the secondary input terminal 18 side is powered up or powered down. Consequently, the added vehicle-mounted electronics can easily be operated.

The protector circuit 21 interrupts the circuit between the relay switch 15 and the output terminal 22 for the time $T_2$. This prevents production of noise during switching when a high-impedance input type vehicle-mounted electronics is switched thereby to be started up. Accordingly, since loud speakers or a video monitor is not influenced by noise or electromotive force, users can be prevented from difficulty in catching the sound due to noise or the like. Furthermore, the above-described arrangement can reduce burden imposed on an output device due to momentarily applied electromotive force etc.

Furthermore, the balance input circuits 14 are provided in the input section 11. This can suppress noise produced in a signal supplied in an analog manner from a vehicle-mounted electronics. Consequently, the vehicle-mounted electronics or output device can be prevented from being influenced by noise produced by the ignition or generator of the vehicle.

The foregoing description and drawings are merely illustrative of the principles of the present invention and are not construed in a limiting sense. Various changes and modifications will become apparent to those of ordinary skill in the art. All such changes and modifications are seen to fall within the scope of the invention as defined by the appended claims.

We claim:

1. An adapter for use with vehicle-mounted electronics, comprising an adapter body including:

an input section provided with at least one main input terminal to which a video signal or audio signal is supplied and at least one secondary input terminal to which a video signal or audio signal is supplied;

an output section provided with an output terminal from which a video signal or audio signal is delivered;

a switching element switching an output signal delivered from the input section between the main input terminal side and the secondary input terminal side; and a control section controlling the switching element, wherein the control section includes a detector which detects a signal supplied to the secondary input terminal side, and the control section controls the switching element based on signal detection by the detector so that the output signal delivered from the input section is only switched from the main input terminal side to the secondary input terminal side when a signal is detected front said secondary input terminal side.

2. The adapter according to claim 1, wherein the input section includes a balance input circuit.

3. The adapter according to claim 1, wherein the control section includes a protector interrupts a circuit between the switching element and the output section, for a predetermined time, based on the signal detection by the detector.

4. The adapter according to claim 2, wherein the control section includes a protector interrupts a circuit between the switching element and the output section, for a predetermined time, based on the signal detection by the detector.

\* \* \* \* \*